United States Patent [19]
Badesha et al.

[11] Patent Number: 4,484,945
[45] Date of Patent: Nov. 27, 1984

[54] PROCESS FOR PREPARATION OF CHALCOGENIDE ALLOYS BY SOLUTION COREDUCTION OF A MIXTURE OF OXIDES

[75] Inventors: Santokh S. Badesha, Ontario; Thomas W. Smith, Penfield, both of N.Y.

[73] Assignee: Xerox Corporation, Stamford, Conn.

[21] Appl. No.: 588,604

[22] Filed: Mar. 12, 1984

[51] Int. Cl.$^3$ .............................................. C01B 19/00
[52] U.S. Cl. ................................... 75/0.5 A; 420/579; 420/590; 423/508; 423/509; 423/510
[58] Field of Search .............. 75/0.5 A; 420/579, 590; 423/508, 509, 510

[56] References Cited

U.S. PATENT DOCUMENTS

| | | | |
|---|---|---|---|
| 2,860,954 | 11/1958 | Bueker et al. | 23/209 |
| 3,390,090 | 6/1968 | Taylor et al. | 423/508 |
| 3,540,859 | 11/1970 | Taylor et al. | 423/508 |
| 3,954,951 | 5/1976 | Buckley | 423/510 |
| 4,007,255 | 2/1977 | Buckley | 423/510 |
| 4,009,249 | 2/1977 | Buckley | 423/510 |
| 4,121,981 | 10/1978 | Ward et al. | 204/38 R |
| 4,175,959 | 11/1979 | Karam et al. | 430/134 |

Primary Examiner—W. Stallard
Attorney, Agent, or Firm—E. O. Palazzo

[57] ABSTRACT

Disclosed is a process for the preparation of chalcogenide alloys in high purity which comprises providing a solution mixture of oxides of the desired chalcogens, and subsequently subjecting this mixture to a simultaneous coreduction reaction.

14 Claims, No Drawings

PROCESS FOR PREPARATION OF CHALCOGENIDE ALLOYS BY SOLUTION COREDUCTION OF A MIXTURE OF OXIDES

BACKGROUND

This invention is generally directed to processes for the preparation of chalcogenide alloys, and more specifically the present invention is directed to the preparation of chalcogenide alloys in high purity by simultaneously coreducing a solution of the oxides of the elements desired. Accordingly, there is provided in accordance with the present invention a simple, high yield economically attractive, low temperature process for the direct preparation of chalcogenide alloys of high purity. The resulting chalcogenide alloys are useful for the preparation of imaging members, particularly xerographic photocondutive compositions, for electrostatic imaging systems.

The incorporation of selenium or selenium alloys into xerographic imaging members is well known. These members can be subjected to a uniform electrostatic charge for the purpose of sensitizing the surface of the photoconductive layer, followed by exposure of an image to activating electromagnetic radiation such as light, which selectively dissipates the charge in the illuminated areas of the photoconductive insulating member, wherein a latent electrostatic image is formed in the non-illuminated areas. The resulting image may then be developed and rendered visible by depositing thereon toner particles containing resin particles and pigment particles.

Recently, there has been developed layered organic and inorganic photoresponsive devices containing amorphous selenium, trigonal selenium, amorphous selenium alloys, or halogen doped selenium alloys. One such photoresponsive member is comprised of a substrate, a photogenerating layer containing metal phthalocyanine, metal-free phthalocyanine, vanadyl phthalocyanine, or selenium tellurium alloys, and a transport layer containing a diamine dispersed in a resinous binder, reference U.S. Pat. No. 4,265,990.

Commercially available selenium or selenium alloys for use in electrostatic imaging systems, including layered organic and inorganic photoresponsive devices are generally substantially pure, that is, for example a purity of 99.999 percent or greater is desired, since the presence of impurities has a tendency to adversely effect the imaging properties of selenium, and its alloys including the electrical properties thereof, causing copy quality obtained from such devices to be relatively poor in comparison to devices wherein high purity selenium, and selenium alloys are used.

Many processes are known for the preparation of chalcogenide alloys, particularly selenium containing alloys including, for example, melt blending of the elemental substances such as selenium and arsenic in the proportions desired in the final alloy product. Thus, for example, there is disclosed in U.S. Pat. No. 3,634,134 the preparation of arsenic-selenium alloys by mely blending. This method not only involves high temperatures, but in most instances, crystalline materials are not obtained. Further, in many instances depending on the process parameters, the desired alloy is not obtained rather, by following for example the melt blending process, there is obtained an unhomogenous mixture of arsenic, selenium, and an arsenic selenium alloy. Additionally, in these processes, there must be selected for evaporation, high purity arsenic and high purity selenium, that is 99.999 percent pure and processes for obtaining high purity arsenic and selenium precursors require high temperature distillations which are not desirable. A similar melt-blending method for preparing selenium alloys is disclosed in U.S. Pat. No. 3,911,091.

Also there is disclosed in U.S. Pat. No. 4,007,255 a process for preparing stable red amorphous selenium containing thallium by precipitating selenious acid containing from about 10 parts per million to about 10,000 parts per million of thallium dioxide, with hydrazine from a solution thereof and methanol or ethanol containing not more than about 50 percent by weight of water at a temperature between about 0.20 degrees Centigrade and the freezing point of the solution wherein the resulting precipitate is maintained at a temperature of from about a 0.13 degrees Centigrade to about a 0.3 degrees Centigrade.

Disclosed in U.S. Pat. No. 3,723,105 is a process for preparing a selenium-tellurium alloy by heating a mixture of selenium and tellurium containing 1 to 25 percent by weight of tellurium to a temperature not lower than 350 degrees Centigrade to melt the mixture, followed by cooling gradually the molten selenium and tellurium to around the melting point of the selenium tellurium alloy at a rate not higher than 100 degrees Centigrade per hour, and subsequently quenching to room temperature within 10 minutes.

Further, there is disclosed in U.S. Pat. No. 4,121,981 the preparation of a selenium alloy by, for example, electrochemically co-depositing selenium and tellurium onto a substrate from a solution of their ions wherein the relative amount of alloy deposited on the cathode is controlled by the concentrations of the selenium and the tellurium in the electrolyte, and by other electrochemical conditions. Once the selenium tellurium layer deposited on the cathode has reached the desired thickness, deposition is discontinued and the cathode is removed.

Additionally, there is disclosed in U.S. Pat. No. 3,524,745, the preparation of an arsenic antimony selenium alloy by heating a mixture of these materials at a temperature of 600 degrees Centigrade for a period of several hours in a vacuum, followed by air cooling to room temperature. According to the teachings of this patent, the cooled alloy, depending on the initial composition is completely polycrystalline, a mixture of crystalline and amorphous phases, or completely amorphous.

Furthermore there is disclosed in a copending application U.S. Ser. No. 405,651/82, the disclosure of which is totally incorporated herein by reference, a process for the preparation of chalocogenide alloys of high purity by the simultaneous coreduction of the corresponding esters subsequent to isolation and purification. More specifically there is disclosed in the copending application a process for the preparation of chalocogenide alloys in high purity comprising providing pure esters of the desired chalocogens, and subsequently subjecting the mixture of pure esters to a coreduction reaction with for example hydrazine. In the process of the present invention isolated pure esters are not involved, rather a solution of the oxides are subjected to a coreduction reaction.

While these processes as well as others are suitable for their intended purposes, in most instances, with the primary exception of the process disclosed in the copending application, they require high temperatures and distillation steps. Further, in some instances, these processes result in selenium alloys which have differing electrical properties, which is believed to be a result of inhomogenities known to exist in non-equilibrium glasses. Further, the prior art processes for preparing alloys, with the exception of the process disclosed in the copending application, do not involve the formation of the esters of the desired elements.

There thus continues to be a need for new improved processes for preparing chalcogenide alloys. Additionally, there continues to be a need for an improved simple economically attractive, direct process for the preparation of chalcogenide alloys of high purity. Also, there is a need for improved processes wherein chalcogenide binary and ternary alloys can be obtained in high purity by utilizing substantially similar process parameters and apparatus. Further there continues to be a need for improved processes for the preparation of high purity chalcogenide alloys wherein some of the reactants selected can be recycled. Additionally, there continues to be a need for improved processes for preparing chalcogenide alloys that are homogeneous, are of a crystalline form, and can be obtained in various proportions without using high temperature reaction conditions, and without isolating and purifying any resulting esters. These needs can be satisfied in accordance with the process of the present invention wherein substantially homogeneous chalcogenide crystalline alloys are obtained, by the solution coreduction of a mixture of chalcogenide oxides. In those situations where the rates of reductions of the oxides are comparable, a composition of the resulting alloy mirrors or is substantially identical to the molar composition of the mixture of oxides. In other situations, when the reduction rates are not comparable, the composition of the alloys, may not mirror the molar composition of the elements contained in the mixture of oxides.

OBJECTS OF THE INVENTION

It is an object of the present invention to provide improved processes for the preparation of chalcogenide alloys which overcomes the above-noted disadvantages.

It is yet another object of the present invention to provide improved processes for the preparation of high purity chalcogenide alloys by simultaneously subjecting a solution mixture of the corresponding oxides to a coreduction reaction.

It is yet a further object of the present invention to provide improved processes for the preparation of high purity chalcogenide binary alloys, and ternary alloys, by subjecting a solution mixture of the corresponding oxides to a coreduction reaction.

Yet another specific object of the present invention is the provision of an improved process for preparing high purity alloys of selenium tellurium, selenium arsenic, selenium antimony, selenium bismuth, selenium-tellurium-arsenic, selenium arsenic bismuth, selenium tellurium antimony, and the like by the coreduction of a solution mixture of the corresponding oxides of the desired elements.

In another object of the present invention there is provided processes for the preparation of high purity chalcogenide alloys, which process is simple, economically attractive, presents no significant environmental pollution problems, can be effected at low temperatures, and results in the production of high yields of alloys.

A further object of the present invention is the provision of improved processes for preparing high purity homogeneous chalcogenide alloys in a crystalline from.

These and other objects of the present invention are accomplished by providing an improved process for the preparation of chalcogenide alloys in high purity, which comprises providing a solution of the oxides of the desired elements, and subsequently subjecting this solution to a co-reduction reaction. In one aspect the process of the present invention involves the formation of a solution by mixing the corresponding oxides of the metals desired with an alcohol or glycol, followed by subjecting this solution to a coreduction reaction, and thereafter isolating the desired product therfrom. Thus, the oxides of the elements of groups VA and VIA of the Periodic Table can be treated with an alcohol, or a diol so as to result in a solution mixture. Thereafter there is added to the solution in an effective amount a reducing agent such as hydrazine, and subsequently the desired alloy product is separated from the reaction solution mixture by known methods including filtration. Completion of the reduction reaction results in a black slurry, which when subjected to filtration yields the desired alloy product.

DESCRIPTION OF PREFERRED EMBODIMENTS

The process of the present invention involves subjecting a mixture of chalcogenide oxides contained in solution to a simultaneous coreduction reaction, in order to obtain an alloy of the desired composition, and the desired purity. The coreduction reaction is achieved by for example adding a number of reducing agents to the oxide solution, including hydrazine, sulfur dioxide, thioureas, hydroxylamine, ascorbic acid, and the like.

Depending on the composition of the alloy desired and whether a binary or ternary alloy is to be formed, a solution mixture of the corresponding oxides, are subjected to a coreduction reaction. By coreduction in accordance with the process of the present invention is meant that the appropriate mixture of oxides of the desired elements are simultaneously reduced by the addition of a common reducing agent. Examples of reducing agents that may be selected include hydrazine, sulfur dioxide, thioureas, hydroxylamine, ascorbic acid, and the like, with hydrazine being preferred.

The solution mixture of oxides can be prepared by a number of suitable methods, including mixing the appropriate oxides with an alcohol or diol, followed by slight warming at a temperature so as to effect solution, about 60 to 80 degrees centigrade. Examples of aliphatic diols selected for reaction with the oxides, including the tellurium oxides are ethylene glycol, 1,2 or 1,3- propane diol, propylene glycol, butylene glycol, 1,2 1,3, or 1,4- butane diols, analogous hexane diols, and the like, with ethylene glycol being preferred.

The oxides selected are commercially available from many sources, such as Fisher Scientific, Alpha Products, and the like. These oxides are usually of a purity of from about 98 percent to 99.9 percent.

In one illustrative reduction sequence, a reducing agent such as hydrazine is added dropwise to the solution mixture of oxides until conversion to the chalcogenide alloys is completed as evidenced by for example ceassation of the emission of nitrogen gas from the reaction mixture. This usually occurs in a period of from about 10 minutes to about 45 minutes, however this time period can be greater, or less depending on for example the amount of oxides dissolved and the reduction temperature.

The resulting chalcogenide alloy can then be filtered from the reaction mixture, washed with suitable solvent such as an aliphatic alcohol, or a diol. Subsequently the alloy is allowed to dry. There results alloys of 99.999 percent purity subsequent to completion of the reduction reaction as determined by optical emission spectroscopy. Thus, for example, a binary alloy of selenium tellurium, containing a ratio of 4 parts of selenium to 1 part of tellurium, prepared in accordance with the process of the present invention, contains very insignificant amounts of impurities, for example 2 parts per million of copper, 0.5 parts per million of iron, 1 part per million of magnesium, 0.5 parts per million of nickel, undetectable amounts of aluminum, arsenic, boron, barium, bismuth, calcium, cadmium, cobalt, chromium, mercury, sodium, manganese, molibdium, nickel, lead, antimony, tin, titanium, thallium, and zinc, with the remainder of the composition being selenium and tellurium as determined by optical emission spectroscopy.

More specifically, the reduction reactions are accomplished as described in the copending application identified herein, the disclosure of which has been totally incorporated herein by reference. Thus, the reduction reaction can be accomplished at various suitable temperatures, dependent on, for example, the reducing agent selected and the solvent system used. Generally, the reduction reaction is accomplished at relatively low temperatures, not exceeding about 120 degrees Centigrade. Specifically, the reduction reaction temperature can range from about 25 degrees Centigrade to about 100 degrees Centigrade, depending, for example, on the reducing agent being employed.

The amount of reducing agent needed is dependent on a number of factors, such as its chemical composition, reaction temperatures, concentration of reactants selected, and the like. Thus, for example, hydrazine is usually added in an equimolar quantity until completion of the reduction reaction, while sulfur dioxide is generally bubbled through the solution of the oxides involved for a period of time to cause complete precipitation of the chalcogenide alloys.

In accordance with the process of the present invention, a selenium tellurium alloy can be prepared by the coreduction of a solution mixture of the corresponding pure selenium and tellurium oxides with hydrazine as follows:

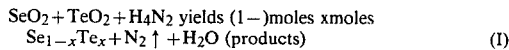
$SeO_2 + TeO_2 + H_4N_2$ yields $(1-x)$moles $x$moles
$Se_{1-x}Te_x + N_2 \uparrow + H_2O$ (products)     (I)

wherein x is a number ranging from about 0.01 to about 0.99. Thus, there can be prepared selenium tellurium alloys containing from about 99 to about 1 percent selenium, and from about 1 percent to about 99 percent by weight of tellurium. Preferred alloys prepared include those compositions wherein selenium is present in an amount of from about 10 to 90 percent and tellurium is present in an amount of from about 90 to 10 percent. The percentage of selenium tellurium contained in the alloy depends primarily on the amount of tellurium and selenium oxides employed, such percentages corresponding substantially to the percentages of selenium and tellurium contained in the oxides. Thus, for example, should a selenium tellurium alloy be desired containing 95 percent of selenium and 5 percent of tellurium, there is employed 95 moles of the corresponding pure selenium oxide, and 5 moles of the corresponding pure tellurium oxide.

Similarly, other selenium alloys are prepared in accordance with the process of the present invention as illustrated in the following reaction sequences, it being noted that an arsenic oxide is selected as a source of arsenic for the resulting alloy product.

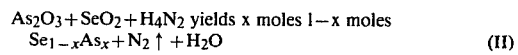
$As_2O_3 + SeO_2 + H_4N_2$ yields x moles $1-x$ moles
$Se_{1-x}As_x + N_2 \uparrow + H_2O$     (II)

wherein x is a number as defined hereinbefore.

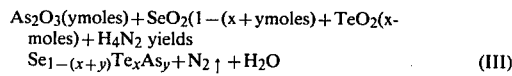
$As_2O_3(y\text{moles}) + SeO_2(1-(x+y\text{moles})) + TeO_2(x\text{moles}) + H_4N_2$ yields
$Se_{1-(x+y)}Te_xAs_y + N_2 \uparrow + H_2O$     (III)

wherein x is a number of from 0.5 to 0.95 and y is a number of from 0.5 to 0.95.

Unlike the selenium tellurium alloys, the arsenic containing alloys, for example, do not mirror the composition of the pure oxide mixture used for formation of such alloys when, for example, hydrazine or sulfur dioxide are selected as the reducing agents, thus apparently the arsenic and selenium oxides are reduced at a different rate in comparison to the rate of reduction of the oxides of selenium and tellurium.

Specific illustrative examples of alloys prepared in accordance with the process of the present invention include $Se_{89.6}Te_{10.4}$; $Se_{87.1}Te_{12.9}$; $Se_{83.6}Te_{16.4}$; $Se_{74.1}Te_{25.9}$; $Se_{49.6}Te_{49.4}$; $Se_{30.2}Te_{69.8}$; $Se_{20.4}Te_{79.6}$; $Se_{10.6}Te_{89.4}$; and the like; as well as ternary alloys such as $Se_{90}Te_{9.8}As_{0.19}$, and the like.

The alloys prepared in accordance with the process of the present invention were substantially pure, crystalline and fairly homogeneous as determined by optical emission spectroscopy (OES), scanning electron microscopy (SEM), energy dispersive X-ray analysis (EDXA), X-ray diffraction (XRD), and differential scanning calorimetry (DSC).

The alloys prepared in accordance with the process of the present invention can be formulated into imaging members by, for example, depositing these alloys on a suitable conductive substrate such as aluminum. The resulting imaging or photoconductive member can then be incorporated into an electrostatographic imaging system such as a xerographic imaging system wherein the imaging member is charged to a suitable polarity, subsequently, developing the resulting latent image with a toner composition comprised of resin particles and pigment particles, followed by transferring the developed image to a suitable substrate such as paper, and optionally permanently affixing the image thereto. Furthermore, the alloys prepared in accordance with the process of the present invention can be utilized in layered photoresponsive devices as the generating layer. These devices usually consist of a conductive substrate, a generating layer, and a transport layer, reference U.S. Patent 4,265,990, the disclosure of which is totally incorporated herein by reference.

The following examples specifically defining preferred embodiments of the present invention are now provided, which examples are not intended to limit the scope of the present invention, it being noted that various alternative parameters which are not specifically mentioned are included within the scope of the present invention. Parts and percentages are by weight unless otherwise indicated.

EXAMPLE I

There was prepared in a 250 milliliter Erlenmeyer flask a solution mixture of oxides by dissolving tellurium dioxide, 1.25 grams, and selenium dioxide 12.64 grams, in 50 milliliters of ethylene glycol with stirring and slight warming to 65 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with ethanol, 60 milliliters, (3×20 milliliter) portions, dried and weighed. There was obtained 9.85 grams of a crystalline and homogeneous alloy product $Se_{89.6}Te_{10.4}$, as determined by spectroscopic analysis.

EXAMPLE II

There was prepared in a 250 milliliter Erlenmeyer flask a solution mixture of oxides by dissolving tellurium dioxide, 1.63 grams, and selenium dioxide 12.18 grams, in 50 milliliters of ethylene glycol with stirring and slight warming to 65 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters of ethanol, (3×20 milliliter) portions, dried and weighed. There was obtained 9.80 grams of a crystalline and homogenous alloy product $Se_{87.1}Te_{12.9}$, as determined by spectroscopic analysis.

EXAMPLE III

There was prepared in a 250 milliliter Erlenmeyer flask a solution mixture of oxides by dissolving tellurium dioxide, 2.0 grams, and selenium dioxide 11.76 grams, in 50 milliliters of ethylene glycol with stirring and slight warming to 65 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters, of ethanol, (3×20) milliliter portions, dried and weighed. There was obtained 9.89 grams of a crystalline and homogenous alloy product $Se_{83.6}Te_{16.4}$, as determined by spectroscopic analysis.

EXAMPLE IV

There was prepared in a 250 milliliter Erlenmeyer flask a solution mixture of oxides by dissolving tellurium dioxide, 3.13 grams, and selenium dioxide 10.50 grams, in 50 milliliters of ethylene glycol with stirring and slight warming to 80 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters of ethanol, (3×20 milliliter) portions, dried and weighed. There was obtained 9.60 grams of a crystalline and homogenous alloy product $Se_{74.1}Te_{25.9}$, as determined by spectroscopic analysis.

EXAMPLE V

There was prepared in a 250 milliliter Erlenmeyer flask a solution mixture of oxides by dissolving tellurium dioxide, 6.25 grams, and selenium dioxide 7.0 grams, in 50 milliliters of ethylene glycol with stirring and slight warming to 80 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters of ethanol, (3×20 milliliter) portions, dried and weighed. There was obtained 9.79 grams of a crystalline and homogenous alloy product $Se_{49.6}Te_{49.4}$, as determined by spectroscopic analysis.

EXAMPLE VI

There was prepared in a 250 milliliter Erlenmeyer flask a solution mixture of oxides by dissolving tellurium dioxide, 8.75 grams, and selenium dioxide 4.2 grams, in 50 milliliters of ethylene glycol with stirring and slight warming to 85 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters of ethanol, (3×20 milliliter) portions, dried and weighed. There was obtained 9.65 grams of a crystalline and homogenous alloy product $Se_{30.2}Te_{69.8}$, as determined by spectroscopic analysis.

EXAMPLE VII

There was prepared in a 250 milliliter Erlenmeyer flask a solution mixture of oxides by dissolving tellurium dioxide, 10.0 grams, and selenium dioxide 2.8 grams, in 50 milliliters of ethylene glycol with stirring and slight warming to 85 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters of ethanol, (3×20 milliliter) portions, dried and weighed. There was obtained 9.69 grams of a crystalline and homogenous alloy product $Se_{20.4}Te_{79.6}$, as determined by spectroscopic analysis.

EXAMPLE VIII

There was prepared in a 250 milliliter Erlenmeyer flask a solution mixture of oxides by dissolving tellurium dioxide, 11.25 grams, and selenium dioxide 1.4 grams, in 50 milliliters of ethylene glycol with stirring and slight warming to 95 degrees centigrade, on a magnetic stirrer. Subsequent to the formation of a clear solution there was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters of ethanol, ($3 \times 20$ milliliter) portions, dried and weighed. There was obtained 9.73 grams of a crystalline and homogenous alloy product $Se_{10.6}Te_{89.4}$, as determined by spectroscopic analysis.

EXAMPLE IX

There was prepared in a 250 milliliter Erlenmeyer flask a solution mixture of oxides by dissolving tellurium dioxide, 1.28 grams, arsenic trioxide, 0.3 grams and selenium dioxide 10.0 grams, in 50 milliliters of ethylene glycol with stirring and slight warming to 65 degrees centigrade, on a magnetic stirrer. Subsequent to the formation of a clear solution these was added in a dropwise manner to the mixture a solution of 6.0 grams of hydrazine contained in 10 milliliters of ethylene glycol. An exothermic reaction ensued and nitrogen gas was emitted. The resulting black slurry was then stirred for 15 minutes, cooled to room temperature and filtered. There resulted a black power which was washed with 60 milliliters of ethanol, ($3 \times 20$ mililiter) portions, dried and weighed. There was obtained 9.25 grams of a crystalline and homogenous alloy product $Se_{90}Te_{9.8}As_{0.19}$, as determined by spectroscopic analysis.

Other modifications of the present invention will occur to those skilled in the art based upon a reading of the disclosure of the present application and these modifications are intended to be included within the scope of the present invention.

We claim:

1. A process for the preparation of chalcogenide alloys in high purity which comprises providing a solution mixture of oxides of the desired chalcogens, and subsequently subjecting this mixture to a simultaneous coreduction reaction.

2. A process in accordance with claim 1 wherein a solution mixture of the oxides of selenium and tellurium are subjected to a coreduction reaction.

3. A process in accordance with claim 1 wherein a solution mixture of the oxides of selenium and arsenic are subjected to a coreduction reaction.

4. A process in accordance with claim 1 wherein a solution mixture of the oxides of selenium, tellurium and arsenic are subjected to a coreduction reaction.

5. A process in accordance with claim 1 wherein the reducing agent is hydrazine or sulfur dioxide.

6. A process in accordance with claim 1 wherein there results a selenium tellurium arsenic alloy.

7. A process in accordance with claim 1 wherein the reduction reaction is accomplished at a temperature of from about 25 degrees Centigrade to about 120 degrees Centigrade.

8. A process in accordance with claim 1 wherein the solvent is ethylene glycol.

9. A process in accordance with claim 1 wherein the solvent is propylene glycol.

10. A process for the preparation of a chalcogenide alloy in high purity which comprises providing a solution mixture of selenium oxides and tellurium oxides and subsequently subjecting this mixture to a simultaneous coreduction reaction with hydrazine or sulphur dioxide, thereby resulting in the product $Se_{89.6}Te_{10.4}$.

11. A process for the preparation of a chalcogenide alloy in high purity which comprises providing a solution mixture of selenium oxides and tellurium oxides and subsequently subjecting this mixture to a simultaneous coreduction reaction with hydrazine or sulphur dioxide, thereby resulting in the product $Se_{87.1}Te_{12.9}$.

12. A process for the preparation of a chalcogenide alloy in high purity which comprises providing a solution mixture of selenium oxides and tellurium oxides and subsequently subjecting this mixture to a simultaneous coreduction reaction with hydrazine or sulphur dioxide, thereby resulting in the product $Se_{83.6}Te_{16.4}$.

13. A process for the preparation of a chalcogenide alloy in high purity which comprises providing a solution mixture of selenium oxides and tellurium oxides and subsequently subjecting this mixture to a simultaneous coreduction reaction with hydrazine or sulphur dioxide, thereby resulting in the product $Se_{74.1}Te_{25.9}$.

14. A process for the preparation of a chalcogenide alloy in high purity which comprises providing a solution mixture of selenium oxides and tellurium oxides and subsequently subjecting this mixture to a simultaneous coreduction reaction with hydrazine or sulphur dioxide, thereby resulting in the product $Se_{49.6}Te_{49.4}$.

* * * * *